June 26, 1928.  1,674,968
A. L. GOLDSTEIN ET AL
FOWL PLUCKING MACHINE
Filed Oct. 11, 1926    2 Sheets-Sheet 2
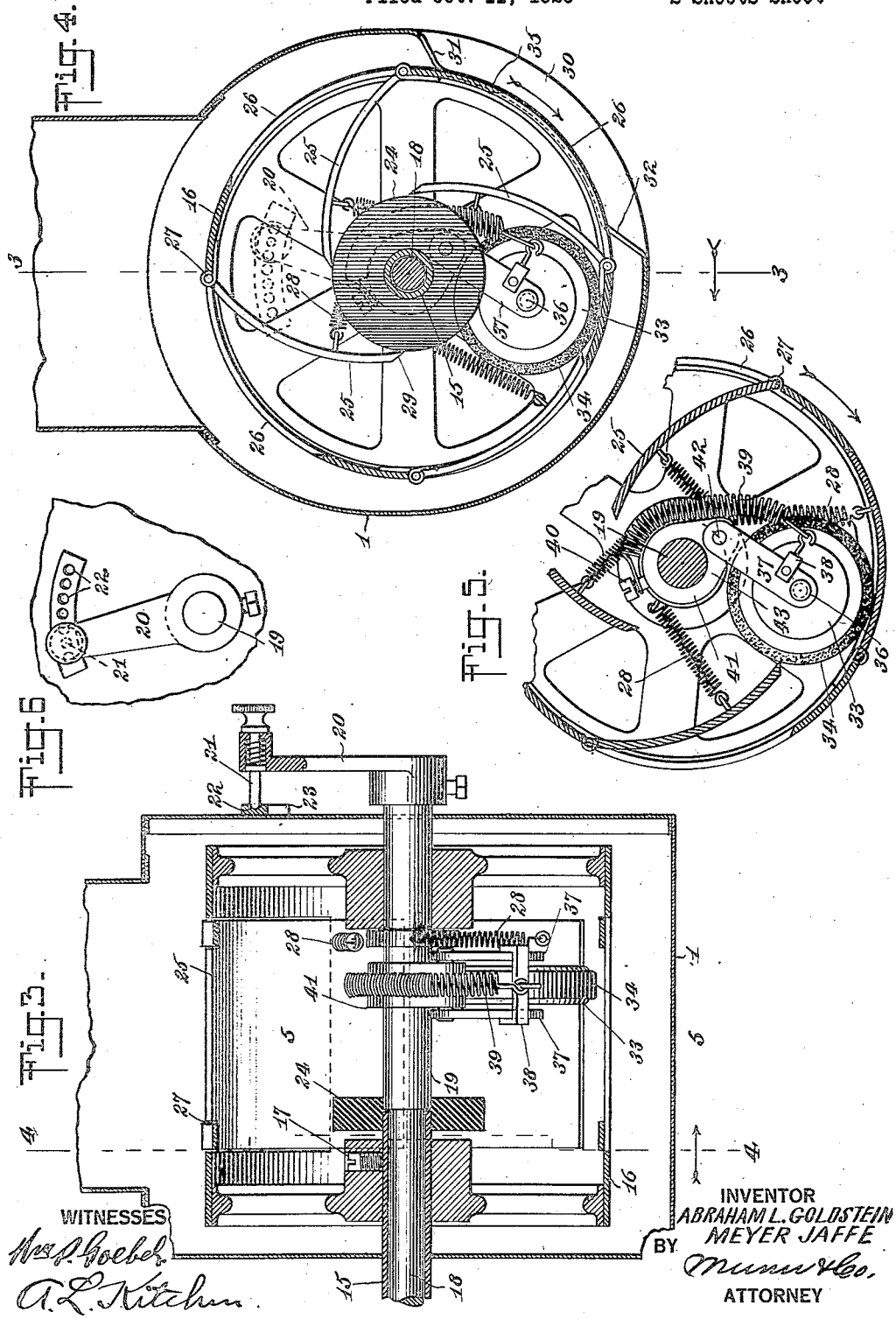
INVENTOR
ABRAHAM L. GOLDSTEIN
MEYER JAFFE
BY
ATTORNEY
WITNESSES Patented June 26, 1928.

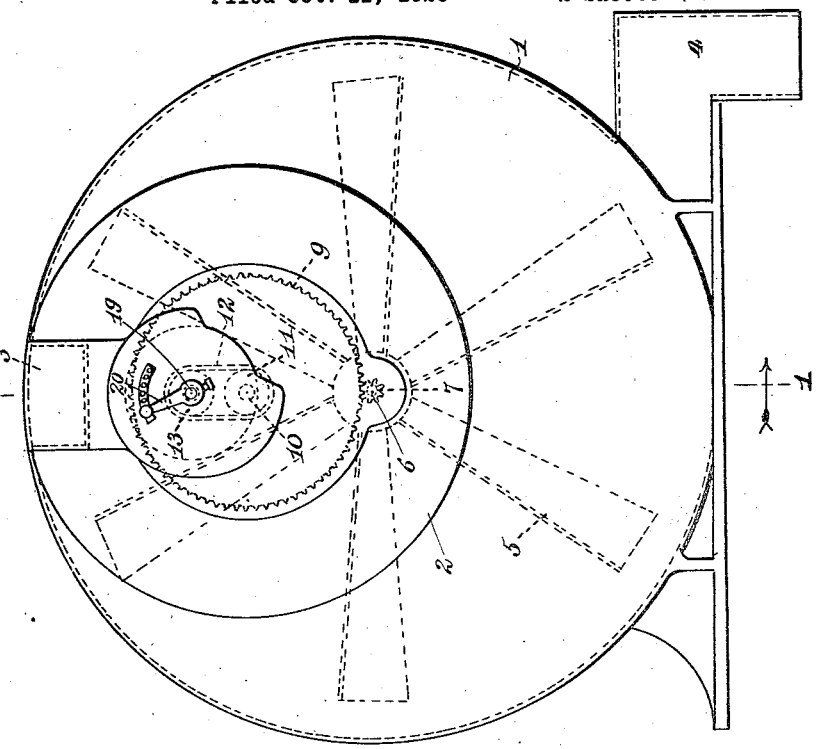
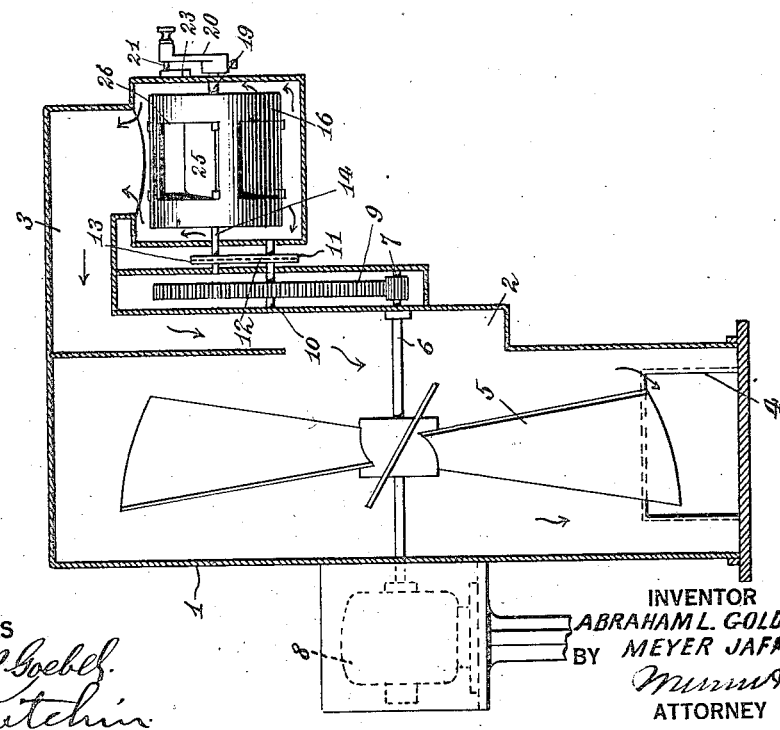

1,674,968

UNITED STATES PATENT OFFICE.

ABRAHAM L. GOLDSTEIN AND MEYER JAFFE, OF NEW YORK, N. Y., ASSIGNORS TO STANDARD FOWL PLUCKER INC., OF NEW YORK, N. Y., A CORPORATION OF NEW YORK.

FOWL-PLUCKING MACHINE.

Application filed October 11, 1926. Serial No. 140,912.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

In the accompanying drawings—

Figure 1 is a longitudinal vertical sectional view through a plucking machine disclosing an embodiment of the invention, said section being taken approximately on line 1—1 of Figure 2.

Figure 2 is a side view of the structure shown in Figure 1.

Figure 3 is a sectional view through Figure 4 on line 3—3.

Figure 4 is a sectional view through Figure 3 on line 4—4.

Figure 5 is a fragmentary sectional view through Figure 3 on line 5—5.

Figure 6 is an enlarged fragmentary elevation illustrating a control arm and associated parts.

The invention is directed to producing a novel and improved machine for plucking all the feathers from fowls with speed, efficiency, and safety to the operative; a machine having a positive, certain and speedy action, removing all feathers from the smallest to the largest, and having a very large simultaneous operative extent and rapid recurrence of the successive plucking operations.

With these and other objects in view the invention comprises primarily a traveling chamber with one or more openings therein, through which a strong current of air is drawn inwardly, and feather gripping devices mounted at the opening to travel with the chamber and to grip and pluck the feathers drawn into the opening by the air current; the feather gripping means also preferably cutting off the air suction through the opening as the feathers are gripped and plucked. The plucking and air controlling means preferably includes a cover adapted to open and close the opening in the travelling chamber, thereby gripping the feathers against the edge of the opening and cutting off the air current as described; the gripping means, whether in the cover form, or otherwise, preferably closing from within the chamber outwardly as a safeguard for the hands of the operator.

The travelling chamber is preferably provided with a plurality of the openings and feather gripping and suction controlling devices, the air being drawn into one of these openings, and out through another, the operation at the air in-taking opening being already described, the gripping means at the other or air emitting openings to release the plucked feathers.

In the present preferred and herewith exemplified embodiment, the air chamber is rotatively mounted with a plurality of air openings in its periphery, there being a door hinged at each of these openings, and located within the cylinder, the door cooperating with the edge of the opening, to grip the indrawn feathers, and to substantially close the opening against the air suction. An approximately oppositely located opening has its door timed to open substantially concurrently to release the plucked feathers which are carried away by the air current.

Other features and objects of the invention will be primarily set forth in connection with the following detailed description; and it will be understood that the preceding general description and the following detailed description are explanatory and exemplary of the invention, but are not restrictive thereof.

Referring to the accompanying drawings by numerals, 1 indicates a casing which may be sheet metal and may be braced in any desired manner. This casing is formed with what may be termed a fan chamber 2, a suction pipe or chamber 3 and a discharge member 4. A fan 5 is mounted in chamber 2 and is rigidly secured to shaft 6 which is journaled in the casing 1 and which at one end has a pinion 7 rigidly secured thereto and at the other end is connected with the rotating element of the motor 8. Pinion 7 meshes with a large gear 9 which is rigidly secured to the shaft 10 journaled in part of the casing 1 and having rigidly secured thereto a sprocket wheel 11 accommodating the chain 12, which chain also passes over a sprocket wheel 13 rigidly secured to the shaft 14. The shaft 14 is formed with a hollow section 15 (Figure 3) at the inner end, said hollow section being rigidly secured to the rotating drum 16 through the clamping set screw 17. A reduced extension 18 of the shaft 19 fits in the hollow section 15. The shaft 19 extends through the opposite end of the drum 16 to section 15 and has secured thereto an arm 20 provided with a spring pressed pin 21 adapted to be fitted into any of the notches 22 in the plate 23. Plate 23 is secured to the casing 1 and is, consequently, stationary, so that the shaft 19 may be locked in different positions for purposes hereinafter fully described. A wheel 24 of rubber, bakelite or other material is rigidly secured in any desired manner to the section 15 so as to rotate therewith, said wheel acting as a bumper for the swinging clamping members 25. The drum 16 is provided with a number of openings 26 and associated with each opening is a clamping member 25 disclosed more clearly in Figure 4. The respective clamping members 25 are hingedly connected at 27 to the drum 16. A spring 28 is connected to each of the clamping members 25 and to the shaft 19. The springs 28 have a continuous tendency to hold the inner ends 29 against the wheel 24 so that the various openings 26 will be left unobstructed until the members 25 are moved to clamping position. It will be noted from Figure 4 that at one point the casing 1 is provided with an opening 30 which exposes the drum 16. At the plucking station, that is, where the fowl is presented to the plucking means to be plucked, projecting sections 31 and 32 are arranged at the end of opening 30 so as to limit the opening and also prevent the fowl from being moved against the drum 16 except at the proper point. As the drum 16 rotates, the members 25 pass beneath the roller 33, which roller is preferably provided with a rubber tire 34. As roller 33 is touching or almost touching the drum 16, the various clamping members 25 will be swung over so that their ends 29 will come in contact with or almost come in contact with the beveled portions 35 and thereby pinch feathers or anything else that may be projecting through the opening 26. Wheel 33 is pivotally mounted on the pin 36 which is journaled on the links 37, said links being connected by a bracket 38 and to which one end of the spring 39 is connected, the opposite end being connected at 40 to a sleeve 41. The inner ends of the links 37 are also pivotally connected at 42 to an extension 43 of sleeve 41. As sleeve 41 is rigidly secured to shaft 19, the tension of spring 39 may be varied by shifting arm 20 and also the position of roller 33 in respect to the drum may be varied. If the feathers to be removed are small and thin, the parts are arranged substantially as shown in Figures 4 and 5. If large quantities and comparatively heavy feathers are to be removed, the arm 20 is adjusted so as to move wheel 33 to cause a closing action of the clamping members 27 sooner. This will cause the clamping members to clamp a less amount of feathers.

In operation, the fowl is held in the opening 30 so that the body will be near the drum 16. When the body is held in this position and fan 5 is rotated, a sufficient suction will be produced to cause the feathers to move in through the opening 26 as soon as the same comes opposite opening 30. The feathers remain projecting through this opening because the suction continues and when the drum moves a certain distance from the position shown in Figure 4 one of the clamping members 25 will swing down and clamp some of the feathers against the part 35 and surrounding parts of the drum. This clamping action is caused by the pivoted end of the clamping member passing beneath roller 33. The roller 33 may yield as it is pivotally mounted and held in position by a spring. This will give a resilient gripping action and will cause a proper pull on the feathers gripped so that the same is pulled from the body while the body is resting against the drum or is held near the drum. As soon as one clamping member 25 has passed, another one will come into operation and the first one will gradually open as it passes the wheel 32. This gradual opening will release the pull of the feathers and the suction from fan 5 will cause the pulled feathers to quickly move through the chamber 3 into chamber 2 and from thence out the discharge member 4.

The device is intended particularly for pulling the feathers from fowls which have not been dipped in hot water. In preparing fowls for sale for Orthodox Hebrews, the fowls must be killed in a certain manner and the feathers must be removed without dipping in hot water. Heretofore, feathers have been removed by pulling by the hands of a workman and sometimes with the assistance of certain machines. In the present invention, a machine has been provided which will perform the pulling operation quickly and easily but the fowl must be held in place by a workman who must turn the fowl in different positions so as to expose the feathers to the openings 26 in drum 16. As an appreciable suction is provided, not only will the feathers be removed but any dirt or foreign matter which is loose.

It will be understood from the foregoing that a mechanism has been provided, realizing the objects and advantages set forth, together with other objects and advantages; and that changes may be made in the details of embodiment without departing from the principles of the invention, and without sacrificing its chief advantages.

What we claim is:

1. In a fowl plucking machine a rotating drum having a series of openings, a swinging gripping member for each of said openings, a spring for normally holding said gripping members away from the openings, and a wheel acting as a cam for forcing said gripping members to a position substantially closing the openings, said wheel causing the gripping members to function once on each revolution of the drum.

2. In a fowl plucking machine a rotating drum provided with a plurality of openings, a swinging clamping member for each of said openings for clamping feathers extending through the openings, a bumper wheel arranged centrally of the drum, a spring for each of said gripping members for normally holding the gripping members against said bumper wheel, and means for swinging each of the gripping members to a gripping position against the action of said spring once on each revolution of the drum.

3. In a plucking machine a rotating drum having a series of openings, a swinging blade acting as a gripping member for each of said openings, means for causing each of said blades to swing to a gripping position when moved past a certain point, and springs for returning said blades to an inoperative position as soon as the means have ceased to function.

4. In a fowl plucking machine a rotating drum having a series of openings, swinging blades for closing said openings, said blades acting as gripping members in connection with the drum, spring means for normally holding said blades away from said openings, a wheel arranged interiorly of the drum and positioned to cause said blades to move to a closed or gripping position as they pass the wheel, and a plurality of means for pivotally and resiliently holding said wheel in an operative position.

5. In a fowl plucking machine a rotating drum having a plurality of openings, a gripping member associated with each opening for gripping feathers projecting through the openings, a wheel acting to cause each of the gripping members to function as the gripping members pass the wheel, a shaft extending into the drum, a sleeve carried by the shaft, links pivotally connected to the sleeve, a pin extending through said links and through the wheel for pivotally supporting the wheel, a spring acting on the links and on the sleeve for resiliently holding the wheel in a given position, and an adjusting arm connected with said sleeve, said adjusting arm being capable of being locked in different positions whereby the position of said wheel will be varied to cause the same to function sooner or later and thereby vary the action of said gripping members.

6. In a machine for plucking feathers from fowl, the combination of a travelling chamber having openings therein, means for creating air suction inwardly through an opening, and means travelling with the travelling chamber for gripping and plucking the feathers sucked into said opening.

7. In a machine for plucking feathers from fowl, the combination of a travelling chamber having a plurality of openings therein, means for drawing an air current inwardly through one of said openings and outwardly through another of said openings, feather gripping means at either of said openings, and means for causing said gripping means to grip the feathers on the fowl which are drawn into said air intaking openings, and means for opening said gripping means at said air discharging opening.

8. In a machine for plucking feathers from fowl, the combination of a travelling chamber having openings therein, means for creating air suction inwardly through an opening, and a substantially air tight cover device for said opening, and actuating means whereby said cover is closed to grip the feathers sucked into the opening and to substantially shut off the air suction.

9. In a machine for plucking feathers from fowl, the combination of a travelling chamber having openings therein, means for creating air suction inwardly through an opening, and a substantially air tight cover movable to close said opening and thereby to grip the feathers sucked into said opening and to substantially shut off the suction through said opening.

10. In a machine for plucking feathers from fowl, the combination of a travelling chamber having openings therein, means for creating air suction inwardly through an opening, and a plucking and air suction controlling device comprising a cover mounted within said chamber and movable outwardly to grip the feathers sucked into said opening and to substantially stop the air suction therethrough.

11. In a machine for plucking feathers from fowl, the combination of a travelling chamber having openings therein, means for creating air suction inwardly through an opening, and means contained within and travelling with the travelling chamber for gripping and plucking the feathers sucked into said opening.

12. In a machine for plucking feathers from fowl, the combination of a rotatable cylinder having an opening in its wall, means for creating air suction inwardly through said opening, and feather gripping means mounted on said cylinder and located at said opening to grip the feathers sucked into the opening.

13. In a machine for plucking feathers from fowl, the combination of a rotatable cylinder having an opening in its wall, means for creating air suction inwardly through said opening, and feather gripping means mounted on said cylinder and located at said opening to grip the feathers sucked into the opening, and to substantially stop the air suction at said opening.

14. In a machine for plucking feathers from fowl, the combination of a rotatable cylinder having an opening in its wall, means for creating air suction inwardly through said opening, and feather gripping means mounted on said cylinder, and cooperating with the edge of the opening to grip the feathers sucked in through said opening.

15. In a machine for plucking feathers from fowl, the combination of a rotatable cylinder having an opening in its wall, means for creating air suction inwardly through said opening, and feather gripping means mounted on said cylinder, and cooperating with the edge of the opening to grip the feathers sucked in through said opening, and to substantially stop the air suction at said opening.

16. In a machine for plucking feathers from fowl, the combination of a rotatable cylinder having a plurality of openings in its wall, means for creating an air current inwardly through one of said openings and outwardly through another, and means for gripping the feathers drawn into one of said openings.

17. In a machine for plucking feathers from fowl, the combination of a rotatable cylinder having a plurality of openings in its wall, means for creating an air current inwardly through one of said openings and outwardly through another, means for gripping the feathers drawn into one of said openings, and means for causing the release of the plucked feathers at the other of said openings.

18. In a machine for plucking feathers from fowl, the combination of a travelling chamber having openings therein, means for creating air suction inwardly through an opening, and means travelling with the travelling chamber for gripping and plucking the feathers sucked into said opening, and means for timing the action of the gripping and plucking means.

19. In a machine for plucking feathers from fowl, the combination of a travelling chamber having openings therein, means for creating air suction inwardly through an opening, and a substantially air tight cover device for said opening, and actuating means whereby said cover is resiliently closed to grip the feathers sucked into the opening and to substantially shut off the air suction.

20. A machine for plucking feathers from fowl, including in combination a plucking station, and feather plucking means travelling past the plucking station, and air suction creating and controlling means comprising devices for creating suction during the presence of feather plucking means at the plucking station and preventing air suction in the absence of feather plucking means from the plucking station.

21. A fowl plucking device combining movable co-operative cylindrical members adapted to come together at a point adjacent to the object to be plucked lying flush with each other when in feather gripping position and means to create an air draft between said members so as to raise the feathers to a position where they may be gripped by said members.

22. In a machine for plucking feathers from fowl, the combination of a traveling chamber having openings therein, means for creating air suction inwardly through an opening, means traveling with the traveling chamber and entering the opening for ruffling gripping and plucking feathers sucked into said opening.

23. In a machine for plucking feathers from fowl, the combination of a traveling chamber having openings therein, means for creating air suction inwardly through an opening, means traveling with the traveling chamber and entering the opening for ruffling up feathers of a fowl, and means for gripping and plucking feathers sucked into the openings.

ABRAHAM L. GOLDSTEIN.
MEYER JAFFE.